(12) United States Patent
Zhang

(10) Patent No.: US 11,950,581 B1
(45) Date of Patent: Apr. 9, 2024

(54) FOLDING PET WATER BOTTLE

(71) Applicant: Shenzhen Rongcheng Innovation Technology Co., LTD, Shenzhen (CN)

(72) Inventor: Fangjian Zhang, Shenzhen (CN)

(73) Assignee: Shenzhen Rongcheng Innovation Technology Co., LTD, Shenzhen (CN)

( * ) Notice: Subject to any disclaimer, the term of this patent is extended or adjusted under 35 U.S.C. 154(b) by 0 days.

(21) Appl. No.: 18/330,451

(22) Filed: Jun. 7, 2023

(30) Foreign Application Priority Data

Mar. 22, 2023 (CN) .......................... 202320598104.1

(51) Int. Cl.
*A01K 7/00* (2006.01)
*A45F 3/20* (2006.01)

(52) U.S. Cl.
CPC ................ *A01K 7/005* (2013.01); *A45F 3/20* (2013.01); *A45F 2003/205* (2013.01)

(58) Field of Classification Search
CPC ..... A01K 7/005; A01K 7/00; A45F 2003/205; A45F 3/20
See application file for complete search history.

(56) References Cited

U.S. PATENT DOCUMENTS

| | | | |
|---|---|---|---|
| 7,490,577 B2 * | 2/2009 | Stephanos | A01K 7/06 119/52.1 |
| 9,155,285 B2 * | 10/2015 | Li | A01K 7/00 |
| 2015/0298867 A1 * | 10/2015 | Sanderson | A47G 19/2266 215/6 |
| 2016/0050884 A1 | 2/2016 | Ross | |
| 2021/0051920 A1 | 2/2021 | Xiao | |

* cited by examiner

*Primary Examiner* — Monica L Perry
(74) *Attorney, Agent, or Firm* — Jeenam Park

(57) ABSTRACT

A folding pet water bottle, including: a drinking water basin and a water bottle component, one end of the water bottle component being pivotally connected to the drinking water basin, the water bottle component including a storage position and a use position, the water bottle component being located in the drinking water basin when in the storage position, the water bottle component being rotated from the storage position to a position away from the drinking water basin and reaching the use position, the water bottle component forming an angle with the drinking water basin for pet drinking water when in the use position, and the water in the water bottle component being able to be discharged into the drinking water basin when in the use position.

6 Claims, 7 Drawing Sheets

US 11,950,581 B1

FOLDING PET WATER BOTTLE

CROSS-REFERENCE TO RELATED APPLICATIONS

This is a U. S. patent application which claims the priority and benefit of Chinese Patent Application Number 202320598104.1, filed on Mar. 22, 2023, the disclosure of which is incorporated herein by reference in its entirety.

TECHNICAL FIELD

The present invention relates to the field of pet supplies, in particular to a folding pet water bottle.

BACKGROUND

The outdoor pet water bottle of the prior art often has a large volume, which makes it inconvenient for logistics transportation and expensive to transport. In addition, when the user stores it, it also takes up a large volume, making it difficult to store.

SUMMARY

The present invention provides a folding pet water bottle to solve at least one of the above technical problems.

To solve above technical problems, as an aspect of the present invention, a folding pet water bottle is provided, including: a drinking water basin and a water bottle component, one end of the water bottle component being pivotally connected to the drinking water basin, the water bottle component including a storage position and a use position, the water bottle component being located in the drinking water basin when in the storage position, the water bottle component being rotated from the storage position to a direction away from the drinking water basin and reaching the use position, the water bottle component forming an angle with the drinking water basin for pet drinking water when in the use position, and the water in the water bottle component being able to be discharged to the drinking water basin when in the use position.

Preferably, the water bottle component includes a bottle body, a button, and a drainage mechanism, the button being set on the top of the bottle body, the drainage mechanism being set on the bottom of the bottle body, the button triggering the drainage mechanism to open or close.

Preferably, the water bottle component further includes a linkage rod, the button being connected to an upper end of the linkage rod, and the button triggering an opening or closing of the drainage mechanism through a lower end of the linkage rod.

Preferably, the linkage rod is set in the bottle body.

Preferably, the water bottle component further includes an upper cover, an upper spring, and an upper sealing ring, the button being set movably in an installation hole of the upper cover, the upper spring being located in the installation hole and sleeved on an outer side of the button, the upper sealing ring being set on a position where the button extends downward from the upper cover, and the upper cover being detachably connected to the top of the bottle body.

Preferably, the button is detachably connected to the linkage rod by insertion.

Preferably, the drainage mechanism includes a lower cover, a lower spring, a valve rod, and a lower sealing ring, the lower cover being connected to a bottom opening of the bottle body, the valve rod being connected to the lower cover through the lower spring, and the lower sealing ring being set on a position where the valve rod extends downward from the lower cover.

Preferably, the folding pet water bottle further includes a carrying rope, both ends of the carrying rope are correspondingly connected to both sides of the drinking water basin.

By using above technical solutions, the folding pet water bottle of the present invention can reduce the storage volume of the pet water bottle, facilitate user storage and logistics transportation, and achieve the purpose of one-button operation for switching on and off the water by means of the button set on the top of the water bottle.

Figure 1:
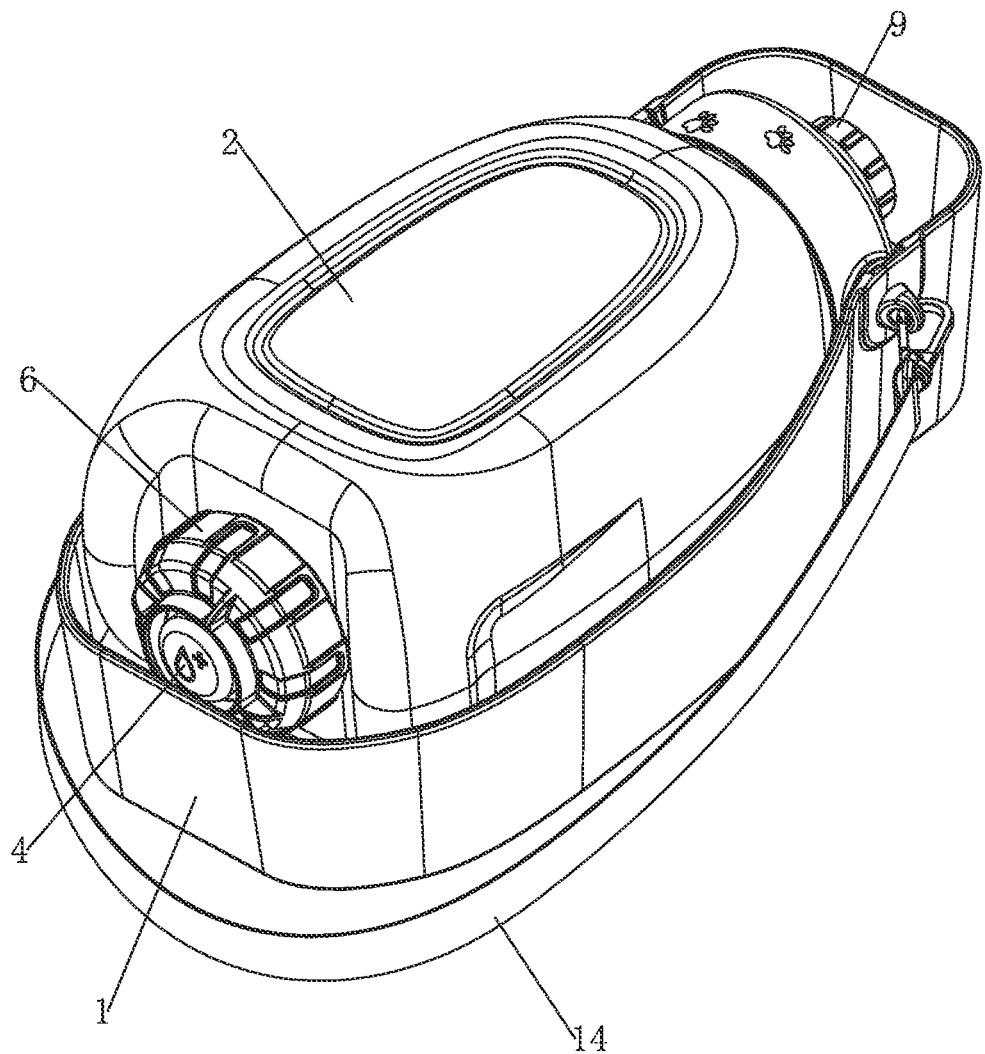
FIG. 1 schematically shows a three-dimensional view 1 of the present invention.
Figure 2:
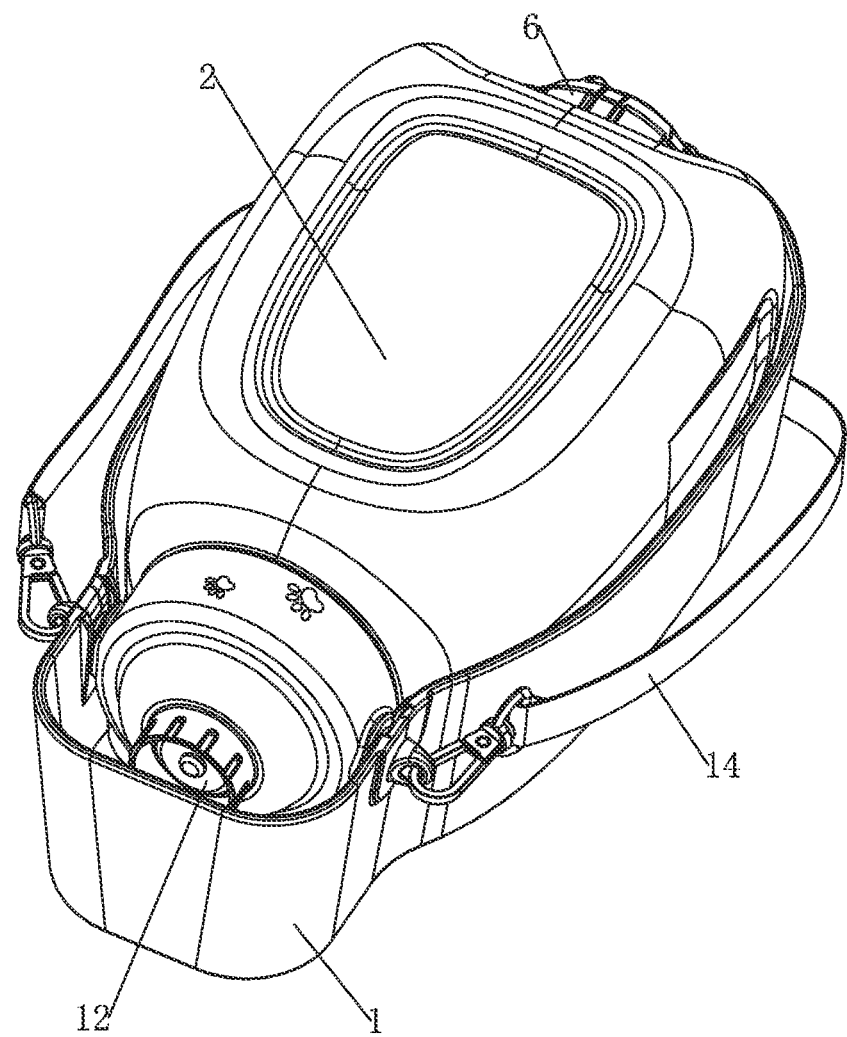
FIG. 2 schematically shows a three-dimensional view 2 of the present invention.
Figure 3:
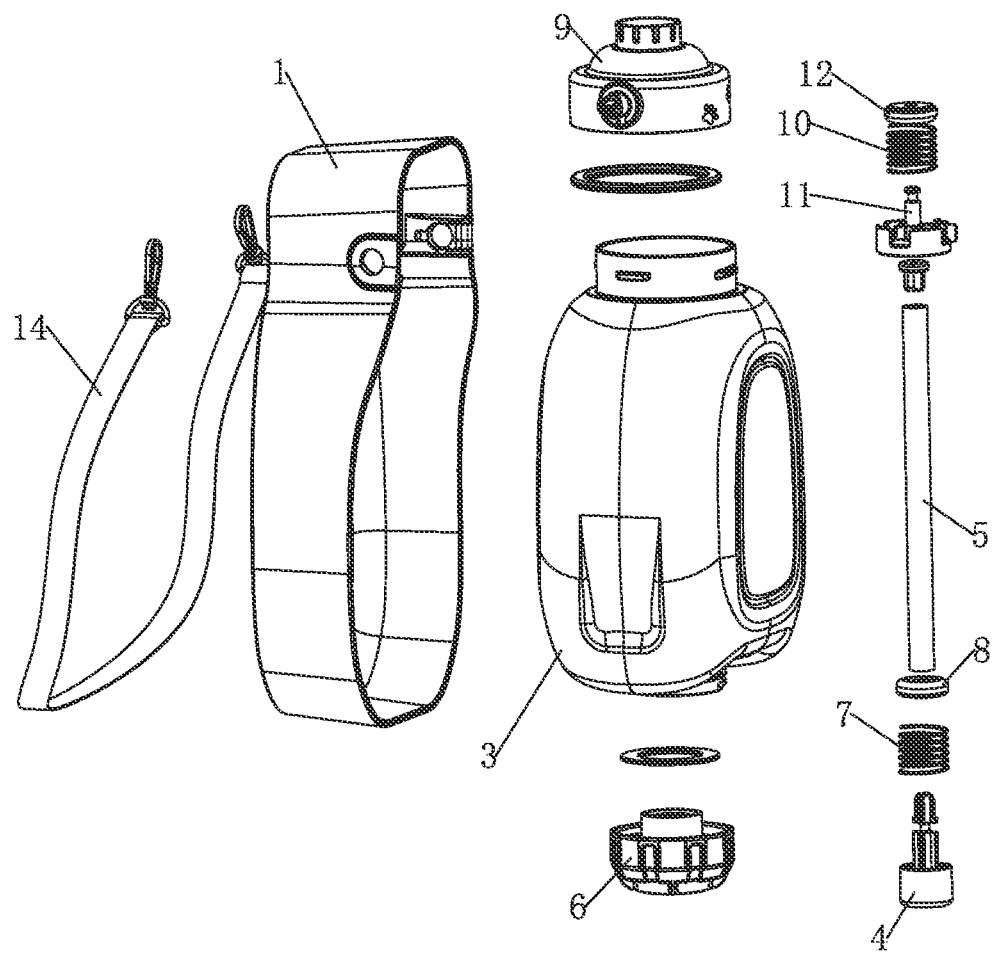
FIG. 3 schematically shows an exploded view of the present invention.
Figure 4:
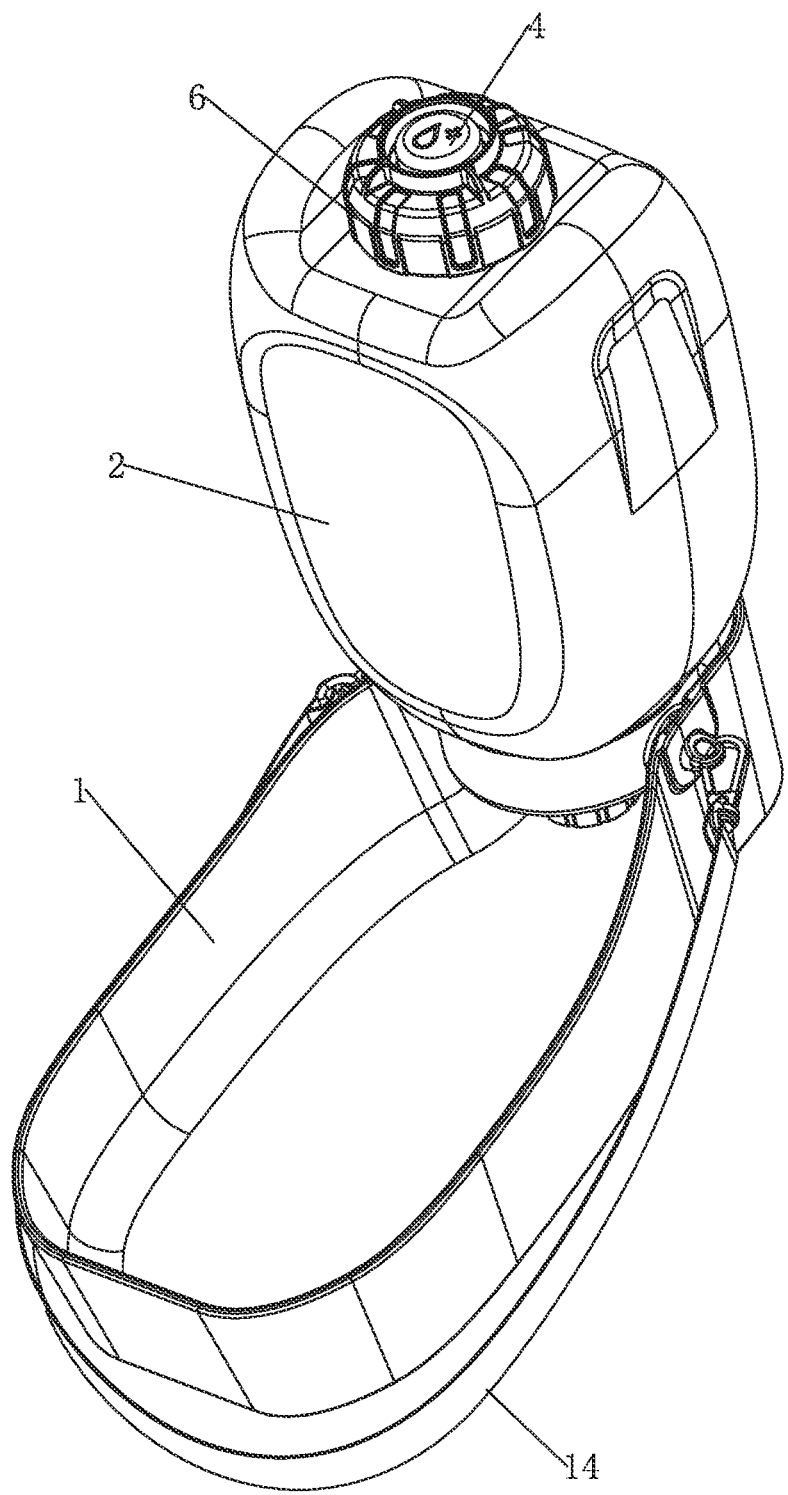
FIG. 4 schematically shows a use status view of the present invention.
Figure 5:
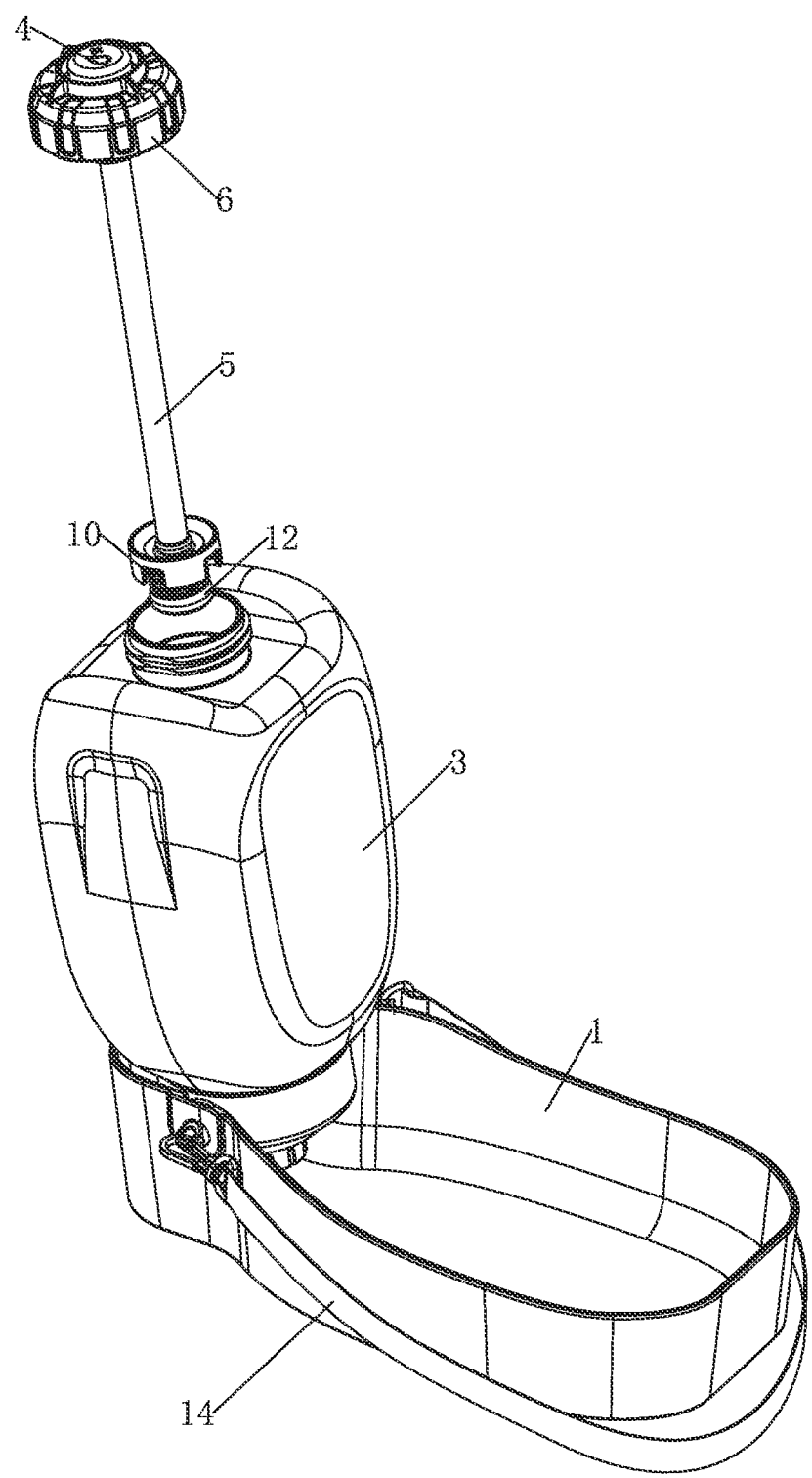
FIG. 5 schematically shows an illustration view of the present invention when water is added.
Figure 6:
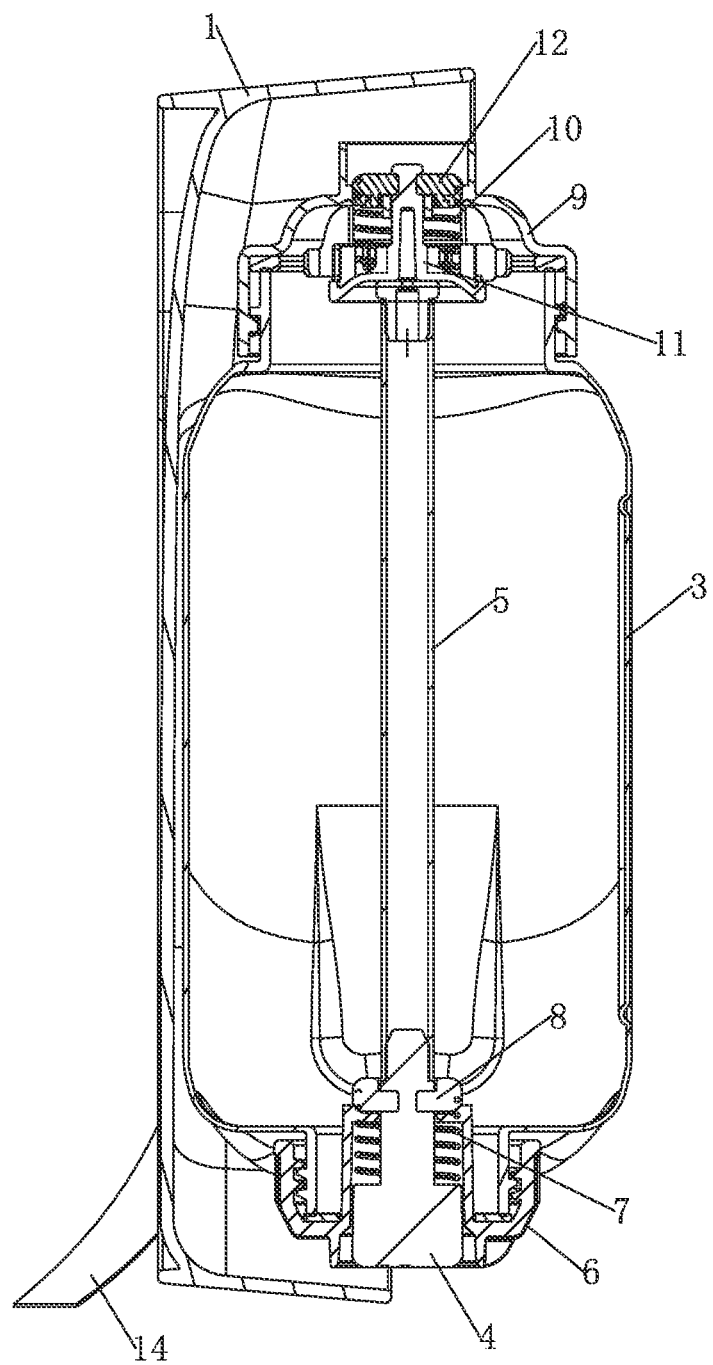
FIG. 6 schematically shows a sectional view of the present invention in a storage state.
Figure 7:
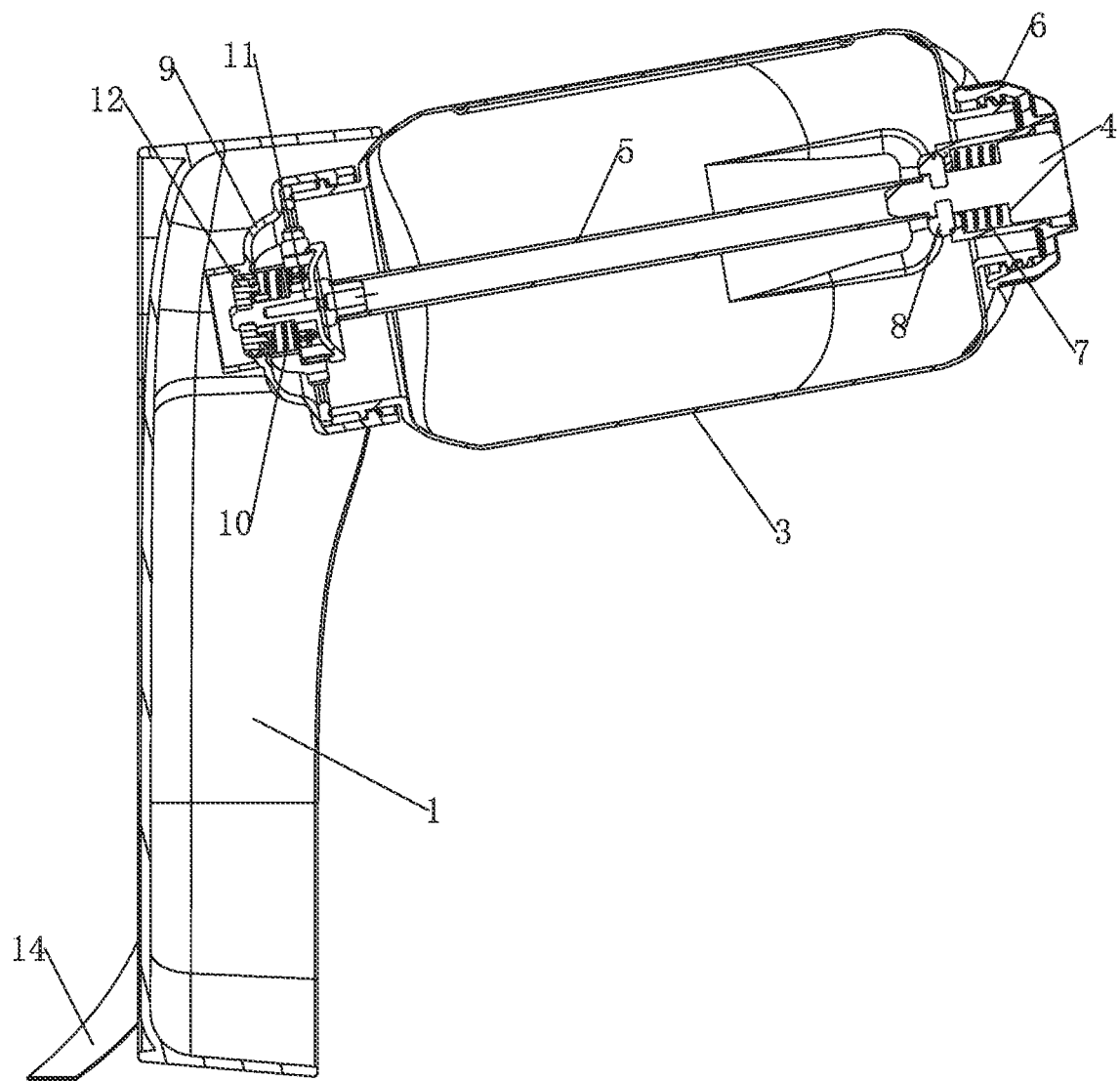
FIG. 7 schematically shows a sectional view of the present invention in a use status.

In the drawings, the notations are as follows:
1, drinking water basin,
2, water bottle component,
3, bottle body,
4, button,
5, linkage rod,
6, upper cover,
7, upper spring,
8, upper sealing ring,
9, lower cover,
10, lower spring,
11, valve rod,
12, lower sealing ring,
14, carrying rope.

DETAILED DESCRIPTION

The following is a detailed description of embodiments of the present invention, but the present invention can be implemented in various different ways as defined and covered by the claims.

As an aspect of the present invention, a folding pet water bottle is provided, including: a drinking water basin 1 and a water bottle component 2, one end of the water bottle component 2 being pivotally connected to the drinking water basin 1, the water bottle component 2 including a storage position and a use position, the water bottle component 2 being located in the drinking water basin 1 when in the storage position, the water bottle component 2 being rotated from the storage position to a direction away from the drinking water basin 1 and reaching the use position, the water bottle component 2 forming an angle with the drinking water basin 1 for pet drinking water when in the use position, and the water in the water bottle component 2 being able to be discharged into the drinking water basin 1 when in the use position. Preferably, when in the use position, the angle between the water bottle component and the drinking water basin 1 is between 90 to 150 degrees, although it is not limited to this range so long as it can remain stable.

When pets do not need to drink water, the water bottle component 2 can be rotated and stored in the drinking water basin 1 for easy logistics transportation and user storage. When using, the water bottle component 2 is placed on a level surface. When pets need to drink water, the water bottle component 2 is rotated out of the drinking water basin 1, and the water in the water bottle component 2 is drained into the drinking water basin 1 for the pet to drink.

Preferably, the water bottle component 2 includes a bottle body 3, a button 4, and a drainage mechanism, the button 4 is set on the top of the bottle body 3, the drainage mechanism is set on the bottom of the bottle body 3, and the button 4 triggers the drainage mechanism to open or close. In this embodiment, the button 4 is set on the top of the bottle body 3. When the present invention is in the use position, the user can press the button 4 to open the drainage mechanism, thereby draining the water in the bottle body 3 into the drinking water basin 1.

In a preferred embodiment, the water bottle component 2 further includes a linkage rod 5, and the button 4 is connected to the upper end of the linkage rod 5. The button 4 triggers the opening or closing of the drainage mechanism through the lower end of the linkage rod 5. In a further preferred embodiment, the linkage rod 5 is set in the bottle body 3. After the button 4 is pressed, the linkage rod 5 also moves downward, triggering the opening of the drainage mechanism.

Preferably, the water bottle component 2 further includes an upper cover 6, an upper spring 7, and an upper sealing ring 8, the button 4 is set movably in the installation hole of the upper cover 6, the upper spring 7 is located in the installation hole and sleeved on the outer side of the button 4, the upper sealing ring 8 is set in a position where the button 4 protrudes below the lower position of the upper cover 6, and the upper cover 6 is detachably connected to the top opening of the bottle body 3. When the button 4 is released or not pressed, under the action of the upper spring 7, the upper sealing ring 8 forms a seal between the lower surface of the upper cover 6 and itself. After the button 4 is pressed, the upper sealing ring 8 moves downwards to release the seal.

Preferably, the button 4 is detachably connected to the upper end of the linkage rod 5 by insertion, facilitating installation and disassembly.

Preferably, the drainage mechanism includes a lower cover 9, a lower spring 10, a valve rod 11, and a lower sealing ring 12, the lower cover 9 is connected to the bottom opening of the bottle body 3, the valve rod 11 is movably connected to the lower cover 9 through the lower spring 10, and the lower sealing ring 12 is set in a position where the valve rod 11 protrudes below the lower position of the lower cover 9. When the linkage rod 5 moves downwards, push the valve rod 11, causing the lower sealing ring 12 on the valve rod 11 to separate from the lower surface of the lower cover 9, and water flows out from the gap between the valve rod 11 and the lower cover 9. After the button 4 is released, under the action of the lower spring 10, the lower sealing ring 12 is in close contact with the lower surface of the lower cover 9 to achieve sealing.

Preferably, the folding pet water bottle further includes a carrying rope 14, and both ends of the carrying rope 14 are correspondingly connected to both sides of the drinking water basin 1. Thus, it is convenient to carry around through the carrying rope 14 after storage.

Using the above-mentioned technical solution, the present invention reduces the storage volume of the pet water bottle, facilitates user storage and logistics transportation, and achieves the purpose of one-button operation to turn on and off water through the button set on the water bottle.

The above descriptions are only embodiments of the present invention, which is used for reference only and not intended to limit the present invention. For those skilled in the art, the present invention may have various modifications and changes. Any modifications, equivalent substitutions, improvements made within the spirit and principle of the present invention are encompassed within the scope of the present invention.

What is claimed is:

1. A folding pet water bottle, characterized in that it includes: a drinking water basin (1) and a water bottle component (2), one end of the water bottle component (2) being pivotally connected to the drinking water basin (1), the water bottle component (2) including a storage position and a use position, the water bottle component (2) being located in the drinking water basin (1) when in the storage position, the water bottle component (2) being rotated from the storage position to a direction away from the drinking water basin (1) and reaching the use position, the water bottle component (2) forming an angle with the drinking water basin (1) for pet drinking water when in the use position, and the water in the water bottle component (2) being able to be discharged into the drinking water basin (1) when in the use position;

wherein, the water bottle component (2) includes a bottle body (3), a button (4), and a drainage mechanism, the button (4) being set on the top of the bottle body (3), the drainage mechanism being set on the bottom of the bottle body (3), the button (4) triggering the drainage mechanism to open or close; and the water bottle component (2) further includes a linkage rod (5), the button (4) being connected to the upper end of the linkage rod (5), the button (4) triggering the drainage mechanism to open or close through the lower end of the linkage rod (5).

2. The folding pet water bottle according to claim 1, characterized in that the linkage rod (5) is set in the bottle body (3).

3. The folding pet water bottle according to claim 1, characterized in that the water bottle component (2) further includes an upper cover (6), an upper spring (7), and an upper sealing ring (8), the button (4) being set movably in an installation hole of the upper cover (6), the upper spring (7) being located in the installation hole and sleeved on an outer side the button (4), the upper sealing ring (8) being set on the position where the button (4) protrudes below a lower position of the upper cover (6), and the upper cover (6) being detachably connected to a top opening of the bottle body (3).

4. The folding pet water bottle according to claim 3, characterized in that the button (4) is detachably connected to the upper end of the linkage rod (5) by insertion.

5. The folding pet water bottle according to claim 1, characterized in that the drainage mechanism includes a lower cover (9), a lower spring (10), a valve rod (11), and a lower sealing ring (12), the lower cover (9) being connected to a bottom opening of the bottle body (3), the valve rod (11) being movably connected to the lower cover (9) through the lower spring (10), and the lower sealing ring (12) being set in the position where the valve rod (11) protrudes below the lower position of the lower cover (9).

6. The folding pet water bottle according to claim 1, characterized in that the folding pet water bottle further includes a carrying rope (14), and both ends of the carrying rope (14) are correspondingly connected to both sides of the drinking water basin (1).

\* \* \* \* \*